(12) United States Patent
Brown

(10) Patent No.: US 10,063,427 B1
(45) Date of Patent: Aug. 28, 2018

(54) VISUALIZING AND INTERACTING WITH RESOURCES OF AN INFRASTRUCTURE PROVISIONED IN A NETWORK

(71) Applicant: Amazon Technologies, Inc., Seattle, WA (US)

(72) Inventor: Allen Herbert Brown, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 287 days.

(21) Appl. No.: 14/853,702

(22) Filed: Sep. 14, 2015

(51) Int. Cl.
  *G06F 15/16* (2006.01)
  *H04L 12/24* (2006.01)
  *G06T 19/00* (2011.01)

(52) U.S. Cl.
  CPC .......... *H04L 41/145* (2013.01); *G06T 19/003* (2013.01); *H04L 41/0806* (2013.01); *H04L 41/0813* (2013.01); *H04L 41/12* (2013.01)

(58) Field of Classification Search
  CPC .......... H04L 41/22; H04L 41/12; H04L 41/08
  See application file for complete search history.

(56) References Cited

U.S. PATENT DOCUMENTS

| | | | | |
|---|---|---|---|---|
| 7,885,256 | B1 * | 2/2011 | Yenamandra | H04L 41/12 370/389 |
| 8,970,598 | B1 * | 3/2015 | Li | G06T 11/206 345/440 |
| 2009/0279673 | A1 * | 11/2009 | Maffre | H04L 43/50 379/1.03 |
| 2012/0311111 | A1 * | 12/2012 | Frew | G06F 9/5072 709/221 |
| 2013/0218547 | A1 * | 8/2013 | Ostermeyer | G06F 17/5009 703/13 |
| 2015/0142934 | A1 * | 5/2015 | Craine | H04L 41/0806 709/221 |
| 2015/0180949 | A1 * | 6/2015 | Maes | H04L 43/10 709/201 |
| 2015/0372857 | A1 * | 12/2015 | Hasan | H04L 41/08 709/220 |
| 2016/0219078 | A1 * | 7/2016 | Porras | G06F 9/4443 |
| 2016/0234073 | A1 * | 8/2016 | Maes | H04L 41/12 |
| 2016/0323140 | A1 * | 11/2016 | Ponnuswamy | H04L 41/0803 |
| 2017/0070594 | A1 * | 3/2017 | Oetting | H04L 67/32 |

* cited by examiner

*Primary Examiner* — Shean Tokuta
(74) *Attorney, Agent, or Firm* — Lee & Hayes, PLLC

(57) ABSTRACT

Functionality is disclosed herein for visualizing and interacting with resources of an infrastructure in a network, such as a service provider network and/or other networks. A user, such as a customer of a service provider network, may interact with a visual representation of resources of an infrastructure for an application. For example, a customer may interact with graphical models that represent resources of the infrastructure. The customer may interact with a graphical model within the visual representation to change a setting of the associated resource, delete the associated resource, view operating data associated with the associated resource, and the like. In some examples, the visual representation is presented within a virtual reality or enhanced reality environment.

20 Claims, 9 Drawing Sheets

VISUALIZING AND INTERACTING WITH RESOURCES OF AN INFRASTRUCTURE PROVISIONED IN A NETWORK

BACKGROUND

Some network-based computing service providers allow customers to purchase and utilize computing resources, such as virtual machine instances, on a permanent or as-needed basis. In addition to virtual machine instances, such computing service providers typically allow customers to purchase and utilize other types of computing resources. For example, customers might be permitted to purchase access to and use of file and block data storage resources, database resources, networking resources, and other types of computing resources. Utilizing these computing resources as building blocks, customers of such a network-based computing service can create custom solutions that provide various types of functionality, such as application hosting, backup and storage, content delivery, World Wide Web ("Web") hosting, enterprise information technology ("IT") solutions, database services, and others.

It can sometimes be difficult for customers, or potential customers, of computing service providers such as those described above to define, view or make changes to the infrastructure of an application. For example, a significant amount of manual technical effort may be required to define the resources to be utilized by an application as well as the interactions between resources within the network-based computing service. The technical effort required to define an infrastructure that is provisioned in a network-based computing service may be costly and time consuming and might, therefore, present a significant barrier to the utilization of network-based computing services to certain types of customers.

DETAILED DESCRIPTION

Figure 1:
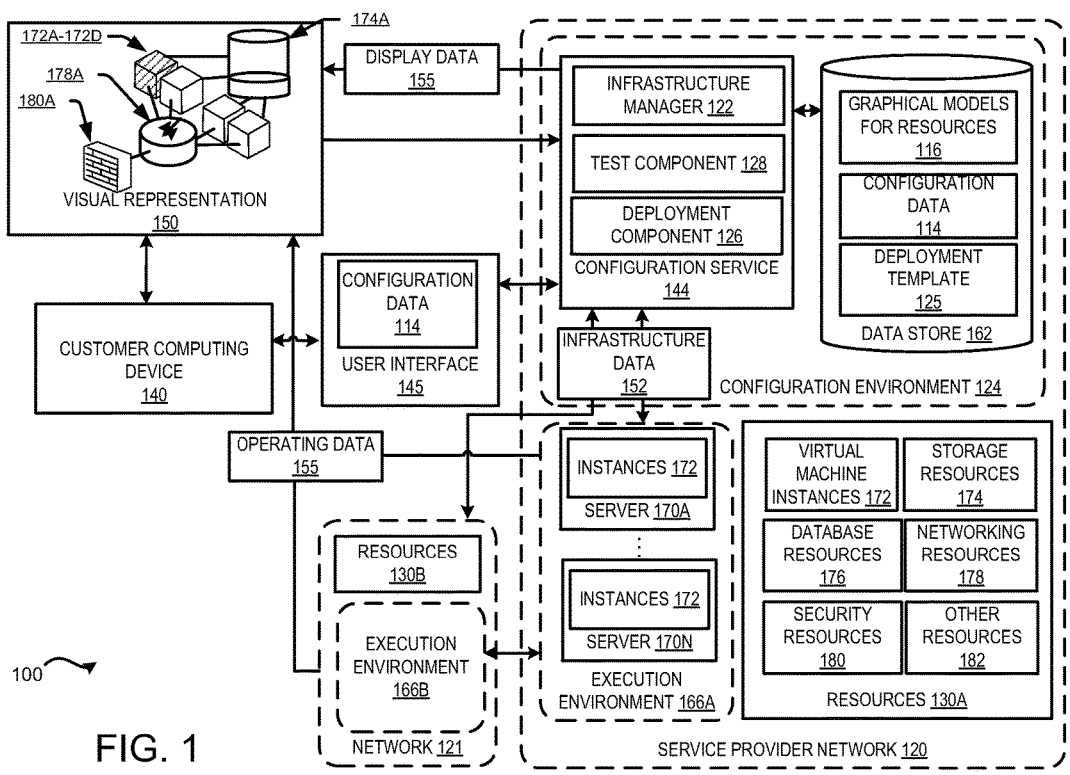
FIG. 1 is a block diagram depicting an illustrative operating environment in which a user may interact with a visual representation of an infrastructure provisioned within a network.

The following detailed description is directed to technologies for visualizing and interacting with resources of an infrastructure provisioned in a network, such as a service provider network and/or other networks. A user, such as a customer of the service provider network, may interact with a visual representation of resources of an infrastructure for an application. For example, a customer may interact with graphical models that represent resources of the infrastructure. The customer may interact with a graphical model within the visual representation to change a setting of the associated resource, delete the associated resource, view operating data associated with the associated resource, and the like.

The graphical models displayed within the visual representation may be based on a type of resource provided by the network. Some example resources that might be represented by graphical models include virtual computing resources, database resources, storage resources, security resources, auto-scaling resources, networking resources, and the like. In some examples, the visual representation of the infrastructure may include three-dimensional graphical models. In some examples, the graphical models are displayed within a virtual reality ("VR") environment. In other examples, the graphical models are displayed within an enhanced reality ("ER") environment. In yet other examples, the graphical models may be two-dimensional.

As briefly discussed above, a user may interact with the visual representation of the infrastructure. For example, a user might "grab" a resource in the VR or ER environment to remove a resource, add a resource, change one or more settings for a resource, or associate the resources in some other manner (e.g., changing the arrangement of the resources). In some examples, the graphical models may include a display area for showing information relating to the provisioning or operating of the resource in the network. In other examples, one or more properties (e.g., color, size, texture map) may change in the displayed visual representation to show information relating to the resource. As an example, an amount of a cylinder that is filled may change as an associated data storage resource stores more data. As another example, the size of a graphical model for a virtual machine instance may change based on the size of the virtual machine instance (e.g., a small cube to represent a single core processor, a medium cube to indicate a four-core processor using 15 GB of memory).

As discussed in more detail below, an infrastructure manager, or some other component, might determine the resources that are deployed in one or more networks, and determine the connections between the resources. After identifying the resources and the connections between the resources in the infrastructure, configuration data and display data may be generated that may be used when displaying the visual representation of the infrastructure.

In some examples, the determined resources and connections may be used to generate a deployment template. The deployment template might be used by a service provider network or another network to provision or update the identified resources. For example, the deployment template might be used by the service provider network to provision resources in another network that is associated with the service provider network. The deployment template might also be provided to a customer of the service provider network. For example, the deployment template may be provided to the customer for later deployment and/or modification. In other examples, the deployment template might be shared with other users.

Once the configuration data describing the configuration of the infrastructure and/or the deployment template has been generated, display data used to present a visual representation of the infrastructure to a user may be generated and provided to a display device. As discussed herein, the visual representation may be used by the customer to view and interact with the infrastructure. During operation, the visual representation may provide an indication of how the resources are operating. In some examples, the visual representation uses operating data that may identify current state information about one or more of the resources associated with the infrastructure. For instance, a graphical model of a resource may change colors based on the status of the resource (e.g., "green" for normal operation, "red" indicating a failure) as well as provide other metrics (e.g., information relating to the functionality provided by the resources). For example, a storage component might include a display of text, or some other graphical element (e.g., a bar) showing how much data the resources has stored in a data store. In some examples, the indication might be some type of indication other than visual (e.g., auditory or haptic).

The visual presentation of the infrastructure might also allow the customer to modify the resources in other ways. For example, a user might be permitted to add, delete, or modify virtual machine instances or other types of data processing resources, file or block data storage resources, database resources, networking resources, such as load balancing resources, domain name service ("DNS") resources, and virtual networking resources, security resources and/or other types of resources.

In some examples, changes made by the customer to the infrastructure may be tested and provisioned within the network(s). In some configurations, the user may change the configuration of the resources displayed within the visual representation during a time the infrastructure is instantiated within the network(s). For example, a user may decide to add another resource (e.g., add an addition resource to the infrastructure). In response to detecting the change, updated infrastructure data may be provided to the configuration service that may be used to update the provisioning of infrastructure in the network. Additional details regarding the various components and processes described above for using a model to define an infrastructure of an application used in a service provider network will be presented below with regard to FIGS. 1-9.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances and the like. As mentioned briefly above, the technologies described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

FIG. 1 is a block diagram depicting an illustrative operating environment 100 in which a user may interact with a visual representation 150 of an infrastructure provisioned within a network. As illustrated, the operating environment 100 includes a customer computing device 140, a configuration environment 124, an execution environment 166A and 166B (which may be referred to herein as "execution environment 166"), resources 130A and 130B (which may be referred to herein as "resources 130"), the visual representation 150, and a user interface 145. In some examples, the computing devices are configured to operate in a service provider network 120 and/or in the network 121.

As described in more detail below, the service provider network 120, and possibly the network 121, may include a collection of rapidly provisioned and, potentially, released computing resources hosted in an execution environment 166A or 166B. Customers of the service provider network 120 may purchase and utilize computing resources 130, such as virtual machine instance 172, networking resources 178, storage resources 174, or other types of computing resources, from a service provider on a permanent or as-needed basis. The computing resources 130A may include a number of computing, networking and storage devices in communication with one another. In some configurations, the computing resources 130A may correspond to physical computing devices, such as the servers 170A-170N. In other configurations, the computing resources may correspond to virtual machine instances, such as the virtual machine instances 172, implemented by one or more physical computing devices, such as the servers 170A-170N.

According to some configurations, the network 121 may be similarly configured to the service provider network 120. For example, the network 121 may have an execution environment 166B and the resources 130B. The resources 130B may be the same or different from the resources 130A. In some examples, the network 121 may be programmatically accessed by the configuration environment 124 and/or the execution environment 166B. For example, the configuration service 144 may configure the resources 130B in the network 121 by sending data (e.g., commands) to one or more computing resources operating in the network 121.

Each type or configuration of a computing resource may be available from the service provider that operates the service provider network 120 in different sizes. For example, a service provider might offer virtual machine instances 172 or other types of data processing resources 130 that are available for purchase and use that have many different configurations of processor capabilities, main memory, disk storage, and operating system. A service provider might also offer other types of resources 130 for purchase and use by customers. For example, a service provider might offer file or block data storage resources 174, database resources 176, networking resources 178, such as load balancing resources, domain name service ("DNS") resources, virtual networking resources, security resources 180 and/or other types of resources 182 on a permanent or as-needed basis.

The service provider operating the service provider network 120 might also charge a fee for operating the resources 130 that the customer creates and uses within the service provider network 120. The fee charged for a particular resource 130 might be based upon the type and/or configuration of the resource 130. The fee charged for a particular resource 104 might also be based upon the amount of time the resource 130 is utilized. For example, in the case of a data processing resource, like a virtual machine instance 172, the fee for use of the resource might be charged based upon the amount of time the resource is utilized. In the case of a data storage resource 174, the fee might be computed based upon the amount of data stored and/or the amount of data transferred into or out of the resource. The fees for other types of resources 130 might also be based upon other considerations. A service provider might also utilize various purchasing models to determine the amount to charge a customer for use of resources 130 provided by the service provider.

The various resources 130 described above might also be provisioned and de-provisioned as needed in an automated fashion. For example, a customer might submit a request to the service provider network 120 to instantiate a new instance of a computing resource 130, such as an instance of a virtual machine. In response to receiving such a request, an infrastructure manager 122, or one or more other components within the service provider network 120, might create the new instance of the virtual machine as requested by the customer. The customer may then be permitted to utilize the new instance of the virtual machine as desired. Other types of computing resources might be instantiated in a similar fashion.

When a customer has finished using a computing resource 130, such as a virtual machine instance 172, the customer may request that the resource 130 be de-provisioned. In response thereto, the infrastructure manager 122, or another component in the service provider network 120, may cause the computing resources 130 to be de-provisioned. Other types of computing resources 130 might also be provisioned and de-provisioned in a similar manner. The service provider network 120 might also provide functionality for automatically scaling and/or de-scaling resources 130 based upon demand for the computing resources 130 or other factors.

As mentioned above, it might be difficult for the customer of a service provider network to visualize and/or change the infrastructure that includes the resources 130 used by an application that executes within the service provider network 120 and/or in the network 121, and possibly other networks (not shown). For instance, in the example shown in FIG. 1, FIG. 2, and FIG. 3, a customer might be interested in viewing the infrastructure for an application that includes computing resources, such as web server instances 172A-172D that auto-scale, a load-balancer 178A, a firewall 180A, and a data storage service 174A. As used herein, the terms "customer" and "customers" refer to existing customers of the service provider network 120 as well as visitors (i.e. potential customers) to the service provider network 120 that are authorized to execute a virtual machine instance 172 (e.g., the instances 172A-172N), or some other execution environment (e.g., containers) in the service provider network 120.

In order to assist a customer of the service provider network 120 in viewing, defining and interacting with an infrastructure, the customer may view a visual representation 150 of the infrastructure. As discussed briefly above, the visual representation 150 may include three-dimensional graphical models representing the resources 130 of the infrastructure. For example, the user might view the visual representation 150 on a display (e.g., a heads up display, a helmet mounted display, or some other display) a using graphical models of different colors, shapes, and/or other visual representations to represent the different types of resources 130.

The visual representation 150 of the infrastructure might include graphical models that represent any resource 130 available from or within the service provider network 120, within the network 121, and possibly within other networks. The visual representation 150 may also include graphical elements representing the connections, such as network connections, between the resources as well as other data that includes additional details that are associated with one or more of the resources 130.

The connections might be determined, by the infrastructure manager 122, or by some other component or computing device. For example, as discussed in more detail with reference to FIG. 2, the infrastructure manager may utilize a rules-based engine or some other technique to identify connections between the resources. In some configurations, the infrastructure manager 122 analyzes the infrastructure data 152 to identify the resources 130 of the infrastructure and the connections between the resources 130. In other examples, the infrastructure manager 122 may determine the connections from the configuration data 114 and/or from the deployment template 125.

In some examples, the infrastructure manager 122 obtains the infrastructure data 152 from identifying the resources 130 executing within an execution environment 166 and identifying the parameters and other resources that are explicitly connected to the resources. For instance, the server instances 172A-172D may specify a connection to the data storage 174A, and indicate that the instances are part of a security group. In some examples, the connections may not be explicitly defined. Instead, the infrastructure manager 122 may identify the connections using some other technique, such as a rules based system or a machine learning mechanism, as described in more detail below. In other examples, the connections between the resources might be determined from a deployment template 125 or configuration data 114 that defines the infrastructure that is deployed or to be deployed within the service provider network 120 or some other network, such as the network 121.

Figure 2:
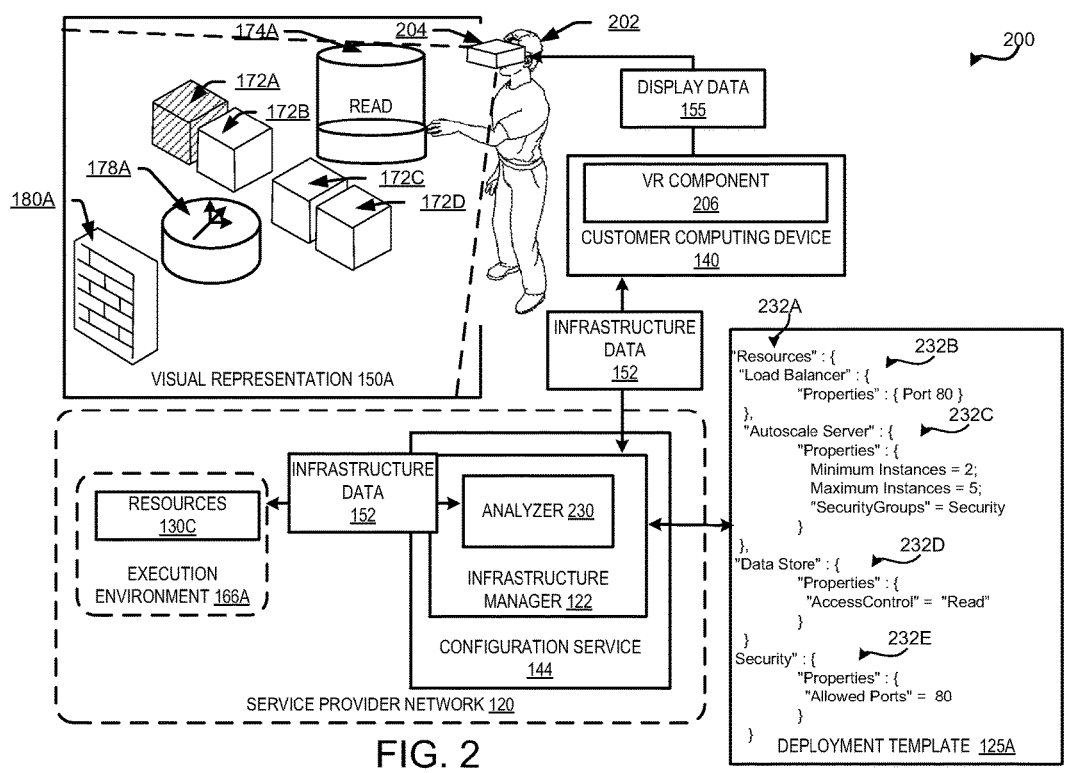
FIG. 2 is a block diagram depicting an illustrative operating environment in which a visual representation of an infrastructure is presented within a virtual reality environment.

The infrastructure data 152 obtained by the infrastructure manager 122 typically depends on the type of resources 130 that are identified. For example, when an identified resource is a security group (e.g., the firewall 180A), the obtained infrastructure data 152 for the security group resource relates to security settings (e.g., allowed ports). When the resource is a virtual machine instance 172, the obtained infrastructure data may relate to the type of the virtual machine instance, as well as other types of information relating to virtual machine instances. FIG. 2 provides more details regarding exemplary infrastructure data 152 that might be obtained.

The infrastructure manager 122 may also analyze the infrastructure data 152 to determine the network connections ("connections") between the resources. For example, the connections might be indicated by the different types of resources within the infrastructure, the use of services, data storage, security groups, and the like by the resources, and the like. For example, the resources that utilize the same block data storage device may be identified by the configuration service as being connected to each other.

In some configurations, the connections may be across different networks. For example, a connection in the infrastructure might connect one or more resources 130A provided by the service provider network 120 with one or more resources 130B provided by the network 121. After identifying the resources 130 and the connections between the resources 130, the infrastructure manager 122 may generate configuration data 114 that describes a configuration of the infrastructure of the application within the service provider network 120 and/or other networks.

In some examples, the configuration data 114 may be used by the infrastructure manager 122, the deployment component 126, or some other computing device, to generate a deployment template 125. The deployment template 125 might be implemented utilizing JavaScript Object Notation ("JSON") language, a text file, or some other suitable language. In some configurations, the deployment component 126, or another component in the service provider network 120, may utilize the deployment template 125 to generate a visual representation of the resources within the infrastructure. In other examples, the service provider network 120 may utilize the deployment template 125 to provision the identified resources.

The deployment template 125 identified from the infrastructure might also be provided to the customer. For example, the deployment template 125 may be provided to the customer for modification. An example of a deployment template 125 that may be generated from an infrastructure is illustrated in FIG. 2. The customer might also share the deployment template 125 with other users.

Once the configuration data 114 describing the configuration of the infrastructure has been generated, and/or the deployment template 125 has been generated, the configuration data 114 and/or the deployment template 125 may be used to generate the display data 155 used to create the visual representation 150 of the infrastructure. In particular, the visual representation may include three-dimensional models to present the resources, parameters for the resources and the connections between the resources for the infrastructure.

According to some configurations, graphical models and/or definitions for the graphical models for the resources 130 may be stored and defined in the graphical models for resources 116 illustrated in the data store 162. The graphical models for resources 116 might include any graphical shape, text, icon or some other type of graphical indicator to represent one or more resources 130 of the service provider network 120 and/or the network 121. For example, the graphical models for resources 116 might include a red cube to represent one resource 130, a green cube to represent another type of resource 130, a cylinder to represent another type of resource 130, and the like.

In other examples, the customer might supply all or a portion of the graphical models that are displayed in the visual rendering for the infrastructure. For example, the customer might provide graphical models that are modifications of graphical models provided by the owner/operator of the service provider network 120 or the network 121. The graphical models specified by the customer might also be new graphical models that have not been defined (e.g. new or different graphical models to represent the available resources 130). The graphical models for the resources 130 might also include text, symbols, or other graphical elements that are used to specify parameters for the resources 130. For example, one symbol might indicate that a data store may be read only, whereas another symbol might indicate that a data store may be read/write.

As briefly discussed above, a component within the service provider network 120, such as a deployment component 126, may utilize the deployment template 125 to provision and instantiate the defined resources 130 in the service provider network 120. Alternately, the deployment component 126 might utilize the configuration data 114 directly to instantiate the defined resources 130 in the service provider network 120. In some examples, the infrastructure is provisioned within the network(s).

After instantiation of the infrastructure within the network(s), the visual representation 150 may provide an indication of how the resources 130 are operating. For instance, the graphical models may change colors indicating the status of the resources (e.g., "green" for normal operation, "red" indicating a failure) as well as provide other metrics (e.g., information relating to the functionality provided by the resources). For example, a graphical model representing a storage component might include a textual indication, or some other type of graphical indicator (e.g., green for available space, yellow for limited space, red for no more space) showing how much data the resources has stored in a data store.

As briefly discussed above, the indication of the how the resources 130 are operating might be provided using some other mechanism in addition to, or as an alternative to a visual indication. For example, the indication might be an auditory indication (e.g., a sound or speech) or a haptic indication (e.g., vibration). According to some configurations, the configuration service 144 monitors the resources 130 in the execution environment (e.g., execution environment 166A and/or 166B). The configuration service 144 might update the visual representation 150 to reflect the current operating data. As discussed above, the operating data may include data relating to the current state or operation of one or more resources within the execution environment.

In some configurations, the user may interact with the visual representation to change the infrastructure during a time the infrastructure is instantiated within the network(s). In response to detecting the change, updated infrastructure data may be provided to the configuration service 144 that may be used to test and/or update the changed infrastructure. According to some examples, the changes to the infrastructure are validated before updating the resources within the network. The test component 128, the infrastructure manager 122, or some other component or computing device, may test the validity of changes made to the infrastructure by the user interacting with the visual representation 150. In some examples, the test component 128 or the infrastructure manager 122 provides an indication to the user viewing the infrastructure as to whether the change is valid or invalid. For instance, the infrastructure manager 122 may update the display data 155 to provide a visual indication (e.g., a resource changes color to green when the change is valid and changes to red when the change is invalid) to indicate the validity of the change.

In some configurations, the test component 128 determines whether an addition, deletion, or change to a parameter of a resource presented within the visual representation is a valid change to the infrastructure. According to some configurations, the test component 128 tests that a change is valid before provisioning the change to the infrastructure executing within the service provider network 120 and/or the network 121. As an example, the test component 128 may indicate that a change is invalid when a parameter of a resource is changed to an unsupported value. Similarly, if a user deletes a resource (e.g., removes the graphical model representing the resource), the test component 128 may determine whether the infrastructure may operate properly without the resource. More details regarding visualizing and interacting with resources of an infrastructure are provided below.

FIG. 2 is a block diagram depicting an illustrative operating environment 200 in which a visual representation 150A of an infrastructure is presented to the user 202 within a virtual reality environment. The operating environment 200 is similar to the operating environment 100. As illustrated, the environment 200 shows the service provider network 120, the deployment template 125A, the configuration service 144, the customer computing device 140, the execution environment 166A, and the visual representation 150A.

The example shown in FIG. 2 is intended to be illustrative, and is not intended to be limiting. As illustrated, a user (e.g., a customer or employee of the service provider created an application for executing in the execution environment 166A provided by the service provider network 120. As depicted in the illustrative example, the visual representation 150A illustrates an infrastructure that includes a firewall resource 180A connected to a load-balancer resource 178A. The load-balancer resource 178A is connected to an auto-scaling group of server instances 170A-170D ("auto-scaling group") connected to a data storage resource 174A.

As discussed above, after the infrastructure is defined (e.g., through the deployment template 125A or some other configuration) and/or already provisioned and executing in the execution environment 166A, the infrastructure data 152 is obtained. In some examples, the infrastructure data 152 may be obtained by the configuration service 144. As discussed above, the infrastructure data 152 identifies the resources 130 of the infrastructure and is used by the infrastructure manager 122 to determine connections between at least a portion of the resources 130.

In some configurations, the infrastructure for a customer of the service provider network 120 is programmatically examined to identify the connections between the resources 130. For example, the infrastructure manager 122 may perform queries to identify each resource 130 of the infrastructure that is operating within the service provider network 120. In some configurations, the infrastructure data 152 about the resources 130 in the infrastructure are determined from Application Program Interface ("API") calls. For example, for an infrastructure operating within AMAZON WEB SERVICES ("AWS"), data about the infrastructure may be determined using "describe" API calls.

For instance, to obtain data about instances in the environment, a "DescribeInstances" call may be made by the infrastructure manager 122. The data returned may include information such as, but not limited to the instance architecture (e.g., i386|x86_64), locations of the instances (e.g., Asia Pacific, EU, South America, US, . . . ), an attach time for an elastic block store (EBS) volume mapped to the instance, a device name for the EBS volume (e.g., /dev/sdh or xvdh), a public DNS name of the instance, a security group for the instance, a name of the security group for the instance, a hypervisor type of the instance (ovm|xen), an ID of the instance. The data might also include whether the instance is a Spot Instance (spot), a state of the instance (e.g., pending, running, shutting-down, terminated, stopping, and stopped), a type of instance (e.g., t2.micro), an ID of the security group for the instance, a public IP address of the instance, a kernel ID of the instance, a monitoring-state indicating whether monitoring is enabled for the instance (disabled|enabled), a name of the placement group for the instance (e.g., is the instance part of a particular group), a platform of the instance (e.g., LINUX, WINDOWS), a private DNS name of the instance, a private IP address of the instance, a name of the root device for the instance (e.g., /dev/sda1 or/dev/xvda), a type of root device that the instance uses (ebs|instance-store), an ID of a subnet for the instance, a virtualization type of the instance (paravirtual-|hvm), an ID of the VPC that the instance is running in. The data might also include a description of the network interface, an ID of the subnet for the network interface, an ID of the VPC for the network interface, an ID of the network interface, an Availability Zone for the network interface, whether the network interface is being managed by AWS, a status of the network interface (available)|in-use), a MAC address of the network interface, a private DNS name of the network interface, an ID of a security group associated with the network interface, a name of a security group associated with the network interface, an ID of the interface attachment, an ID of the instance to which the network interface is attached, an owner ID of the instance to which the network interface is attached, a private IP address associated with the network interface, a device index to which the network interface is attached, a status of the attachment (attaching|attached|detaching|detached), and the like.

Other details about the infrastructure may also be determined. For example, queries about other types of resources might be made (e.g., storage resources, database resources, security resources, networking resources, as well as other types of resources). Generally, in some examples, a deployed infrastructure may be queried to obtain details about the deployment of the resources in the service provider network 120.

After obtaining the infrastructure data 152 at the configuration service 144, the infrastructure manager 122 may analyze the infrastructure data 152 as discussed above to identify the resources in the defined infrastructure. In some examples, the infrastructure manager 122 utilizes an analyzer 230 that is configured to identify the resources 130C and determine the connections between the resources 130C.

The analyzer 230 may utilize a rules based system and/or machine learning techniques to determine the connections between resources 130 of the infrastructure. The term "rules based system" may refer to one or more programs that uses rules (e.g., a knowledge base) and an inference engine or semantic reasoned which infers information or takes action based on the interaction of input and the rule base. In the current example, the analyzer 230 would access rules that indicate when a particular resource is connected to another resource.

The term "machine learning" may refer to one or more programs that learns from the data it receives. For example, a machine learning mechanism may build, modify or otherwise utilize a model that is created from example inputs and makes predictions or decisions using the model. In the current example, the machine learning mechanism may be used to improve the identification of the connections between the resources 130 of the infrastructure. The model may be trained using supervised and/or unsupervised learning. For instance, over time as the machine learning mechanism receives more infrastructure data 152, the connection data identifying the connections determined by the analyzer 230 may change based on actual data received from the service provider network 120 or other networks.

Different machine learning mechanisms may be utilized. For example, a classification mechanism may be utilized to determine a likelihood of two or more resources being connected. The classification mechanism may classify the connections into different categories that provide an indication of whether the connection with a particular resource is likely. For example, the resources that are likely to be connected may be classified into a first category (e.g., likely to be connected) and a second category (e.g., unlikely to be connected). In some configurations, more classification categories may be utilized. In other examples, a statistical mechanism may be utilized to determine the connections. For example, a linear regression mechanism may be to generate a score that indicates a likelihood of a connection between resources. Linear regression may refer to a process for modeling the relationship between one variable with one or more other variables. Different linear regression models might be used to calculate the score associated with a likelihood of the connection. For example, a least squares approach might be utilized, a maximum-likelihood estimation might be utilized, or another approach might be utilized.

The linear models may be simple linear models (e.g., a single predictor variable and a single scalar response variable) or may be multiple regression models (e.g., multiple predictors). The models might also be general linear models, heteroscedastic models, generalized linear models (e.g., Poisson regression, logistic regression, or multinomial logistic regression), Bayesian linear regression, quantile regression, and the like.

After identifying the resources 130C, and connections between the resources 130C, the infrastructure manager 122 may generate the configuration data 114, the display data 155 and/or create the deployment template 125A. As discussed above, a deployment template, such as the deployment template 125A, may define the infrastructure of an application in a service provider network 120 and/or within other networks. In the current example, the deployment template 125A includes data describing the configuration of the resources 130A represented in the visual representation 150A. The illustrated deployment template 125A is simplified for purposes of explanation. For example, the deployment template 125A may include other data, such as parameters that define attributes of the resource, mappings that are used to identify items in the template, outputs that might be provided to the customer, or the like. The resources 130 might also include more or fewer properties.

As illustrated, the deployment template 125A includes a resources section 232A that includes a load balancer section 232B, an auto-scale server section 232C, a data store section 232D and a security section 232E. The infrastructure manager 122 may identify the resources 130A using the infrastructure data 152 to create each of the sections 232A-232E contained in the deployment template 125A. In other examples, the infrastructure manager 122 may include more information in the deployment template 125A that might not be depicted in the visual representation 150A. For example, the infrastructure manager 122 might include one or more resources 130 that are needed in order to deploy the infrastructure represented in the visual representation 150A.

The deployment template 125A might be defined such that the infrastructure manager 122 or some other component (e.g., the deployment component 126) may use the deployment template 125A to provision the resources 130A in the service provider network 120 and/or instantiate the infrastructure in the service provider network 120.

In the current example, the security section 232E of the deployment 180A indicates that the firewall resource 180A is configured to allow traffic using port 80. As discussed in more detail below, the user 202 might interact with the visual representation 150A to set the allowed ports and/or other settings. In yet other examples, the user might utilize some other type of interface (not shown) to specify a parameter.

The auto-scaling group 232C is set to use two servers as the minimum number and the maximum number of servers is set to five. The auto-scaling group 232C is also set to be part of the security group "security". The load balancer section 232B of the deployment template 125A sets the properties to balance traffic from "port 80". The data store section 232 indicates that the data storage is set to "READ" only mode.

After the infrastructure manager 122 determines the resources 130C, the connections between the resources 130C and/or creates the deployment template 125A, the display data 155 may be generated by the infrastructure manager 122, the VR component 206, and/or some other component or computing device. In the current example, the visual representation 150A is displayed to the user 202 within the head-mounted display 204. As discussed above, other types of displays may be utilized to display the visual representation 150A. In the current example, the infrastructure manager 122 provides the display data 155 to the customer computing device 140.

The customer computing device 140, using the VR component 206, then provides the display data 155 to the head mounted display 204 for presentation to the user 202. The user might view the visual representation 150A to determine whether the infrastructure manager 122 analyzed the infrastructure data 152 associated with the infrastructure correctly as well as view the current operating state of the resources. As discussed above, the user 202 might also change parameters associated with the resources 130, add/delete resources, and the like.

VR provides the user 202 with an immersive experience. Generally, VR appears to place the user 202 within an environment and allows the user 202 to interact with the environment. While not shown, one or more sensing devices may be used to track the location of a hand of a user as well as gestures performed by the hand (e.g., open, close, point). For instance, a glove with one or more sensors may be utilized and/or a motion sensing device may be utilized. For example, motion might be detected using Infrared (passive and/or active), video and camera systems, radio frequency energy (radar, microwave and tomographic motion detection), sound (microphones and acoustic sensors), and the like.

While the user 202 is participating in the VR experience, the user 202 might interact with one or more of the resources illustrated in the visual representation 150A. For example, the user might touch a portion of the storage 174A to obtain more information about the operating state of the storage 174A (e.g., how much storage is used, how much storage is allocated, whether the storage is read only, read/write, and the like). The user 202 might also change the position of one or more of the displayed resources. For instance, the user 202 might have moved firewall 180A to the current position after recognizing that the firewall 180A was improperly positioned within the infrastructure. In some cases, the user 202 might also remove resources or add resources to the infrastructure. For example, to remove a resource the user 202 might grab a resource and then place the resource into a virtual "trash can". To add a resource, the user 202 might access a virtual menu, select a resource, and then place that resource into the infrastructure.

As the user 202 is making changes to the infrastructure, the VR component 206 may provide the updated infrastructure data 152 to the infrastructure manager 122. The infrastructure manager 122 may deploy changes to the infrastructure indicated by the updated infrastructure data 152.

In some examples, the infrastructure manager 122 tests the validity of the changes made to the infrastructure before deploying the updates to the service provider network 120. For example, if the user changes a size of the storage 174A to be smaller than what is already stored, the infrastructure manager 122 may determine that the change is not valid and provide an indication to the user 202 within the headset 204 (e.g. flash the resource red) or provide some other indication that the change is not valid. The infrastructure manager 122 may also update the deployment template 125 to reflect the changes.

Figure 3:
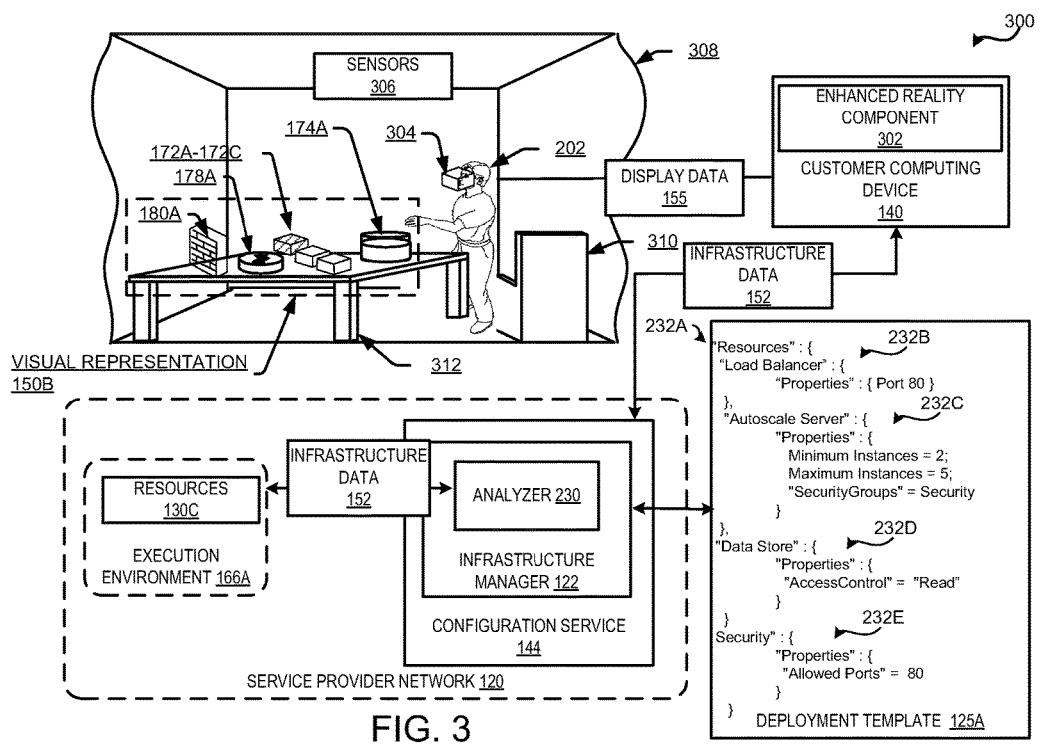
FIG. 3 is a block diagram depicting an illustrative operating environment in which a visual representation of an infrastructure is presented within an enhanced reality environment.

FIG. 3 is a block diagram depicting an illustrative operating environment 300 in which a visual representation 150B of an infrastructure is presented within an enhanced reality environment. The operating environment 300 is similar to the operating environment 200. As illustrated, the environment 300 shows the service provider network 120, the deployment template 125A, the configuration service 144, the customer computing device 140, the execution environment 166A, and the visual representation 150B.

The example shown in FIG. 3 is intended to be illustrative, and is not intended to be limiting. As illustrated, a user (e.g., a customer or employee of the service provider created an application for the infrastructure 130C executing in the execution environment 166A provided by the service provider network 120. As depicted in the illustrative example, the visual representation 150B illustrates an infrastructure that includes a firewall resource 180A connected to a load-balancer resource 178A. The load-balancer resource 178A is connected to an auto-scaling group of server instances 170A-170C ("auto-scaling group") that is connected to a storage resource 174A. In the current example, the auto-scaling group of server instances includes three server instances instead of the four server instances illustrated in FIG. 2. For example, the load on the server instances may have reduced allowing one of the server instances illustrated in FIG. 2 to be removed.

After identifying the resources 130C, and the connections between the resources 130C, the infrastructure manager 122 may generate the display data 155 and/or create the deployment template 125A. In the current example, the infrastructure manager 122 provides display data 155 to the customer computing device 140.

The customer computing device 140, using the enhanced reality component 302, then provides the display data 155 to the heads-up display 304 for presentation to the user 202. The head-up display 304 allows the user 202 to see physical objects in the environment 308 in addition to the graphical models illustrated in the visual representation 150B. As discussed above, other types of displays may be utilized to display the visual representation 150B. The user might view the visual representation 150B to determine whether the infrastructure manager 122 analyzed the infrastructure data 152 associated with the infrastructure correctly as well as view the current operating state of the resources. As discussed above, the user 202 might also change parameters associated with the resources 130, add/delete resources, and the like.

Enhanced reality ("ER") or "augmented reality" provides the user 202 with an immersive experience in which the user 202 may see both the physical objects in the real world environment 308 along with computer-generated graphical objects. Generally, enhanced reality is a live view of a physical, real-world environment whose objects are augmented (or supplemented) by computer-generated sensory input such as sound, video, graphics or GPS data. In contrast, VR as illustrated in FIG. 2 replaces the real environment with a simulated environment. In the current example, the visual representation 150B of the resources appears to the user 202 as if the resources are resting on the physical table 312.

As illustrated, the environment 308 includes sensors 306. The sensors 306 may be utilized by the enhanced reality component 302 for purposes such as, but not limited to, determining the location of the user 202 within the environment, determining the location of the physical objects in the environment (e.g., the chair 310, and the table 312), as well as providing visual, tactile, or sound output. The sensors 306 may include digital cameras and/or other optical sensors, accelerometers, GPS, gyroscopes, solid state compasses, RFID and wireless sensors, speech recognition devices, projectors, and the like.

While the user 202 is participating in the ER experience, the user 202 might interact with one or more of the resources illustrated in the visual representation 150B. For example, the user might touch any one of the resources displayed within the visual representation 150B. Touching a displayed resource, or some portion of the resource, may be an indication to obtain more information about the operating state of the resource. The user 202 might also change the position of one or more of the displayed resources. In some cases, the user 202 might also remove resources or add resources to the infrastructure.

As the user 202 is making changes to the infrastructure, the ER component 302 may provide the updated infrastructure data 152 to the infrastructure manager 122. The infrastructure manager 122 may deploy the updated infrastructure data 152 to the execution environment 166A within the service provider network 120A. For example, the infrastructure manager 122 may update the parameters for resources adjusted by the user 202.

In some examples, as discussed above, the infrastructure manager 122 tests the validity of the changes made to the infrastructure before deploying the updates to the service provider network 120. The infrastructure manager 122 may also update the deployment template 125 to reflect the changes.

Figure 4:
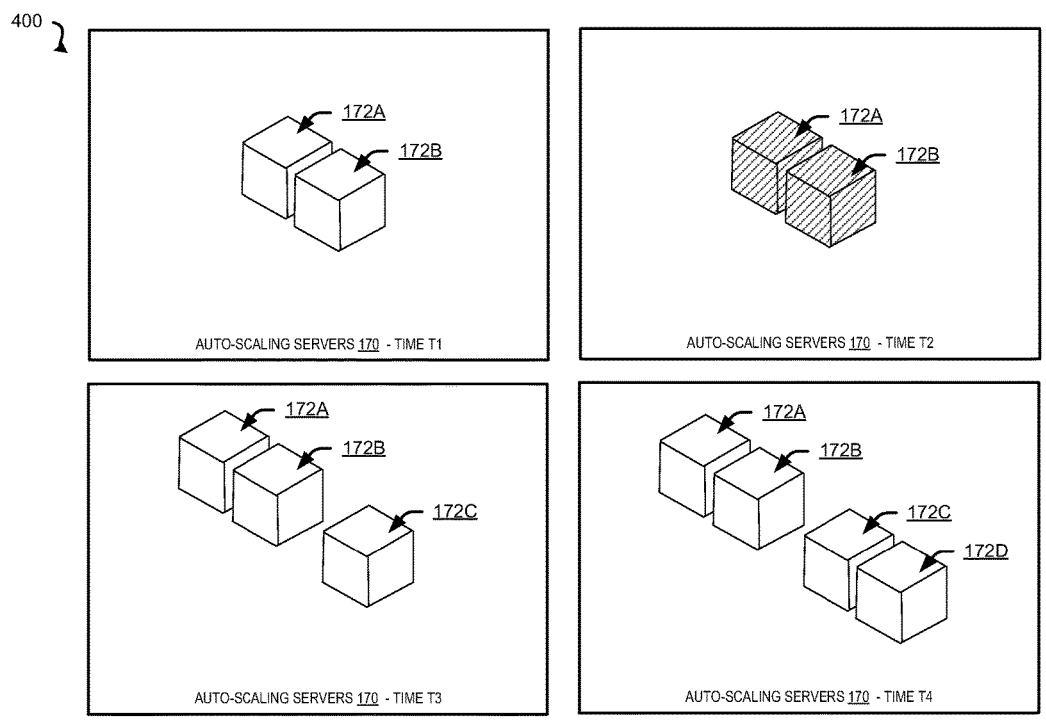
FIG. 4 is a block diagram depicting an illustrative operating environment in which the display of a graphical model depicting a resource changes over time.

FIG. 4 is a block diagram depicting an illustrative operating environment 400 in which the display of a graphical model depicting a resource changes over time. The operating environment 400 may be similar to the operating environments 100, 200, or 300. In the current example, the graphical models 170A-170C represent the server instances that are part of an auto-scaling server group.

As discussed above, an infrastructure including an auto-scaling server group may be provisioned in one or more networks and begin to operate. At time T1, the infrastructure is operating with two server instances 170A and 170B within the network. While the infrastructure is operating within the network, the user may look at the graphical models 170A-170B to determine a current status for the server instances that are being utilized. For example, the server instances 170A-170B at time T1 shows a normal operating status.

At time T2, the server instances 170A-170B provide a visual indication (e.g., the fill pattern displayed on the boxes) that the servers are operating at capacity or near capacity. While a fill pattern is illustrated, other representations may be used to illustrate an operating status of the server instances. For example, a texture map may be changed, a color may be changed, a sound may be added, haptic feedback may be provided, and the like.

At time T3, an additional server instance 170C has been provisioned and is operating properly within the network. At time T4, yet another additional server instance 170D has been provisioned and is operating properly within the network.

Figure 5:
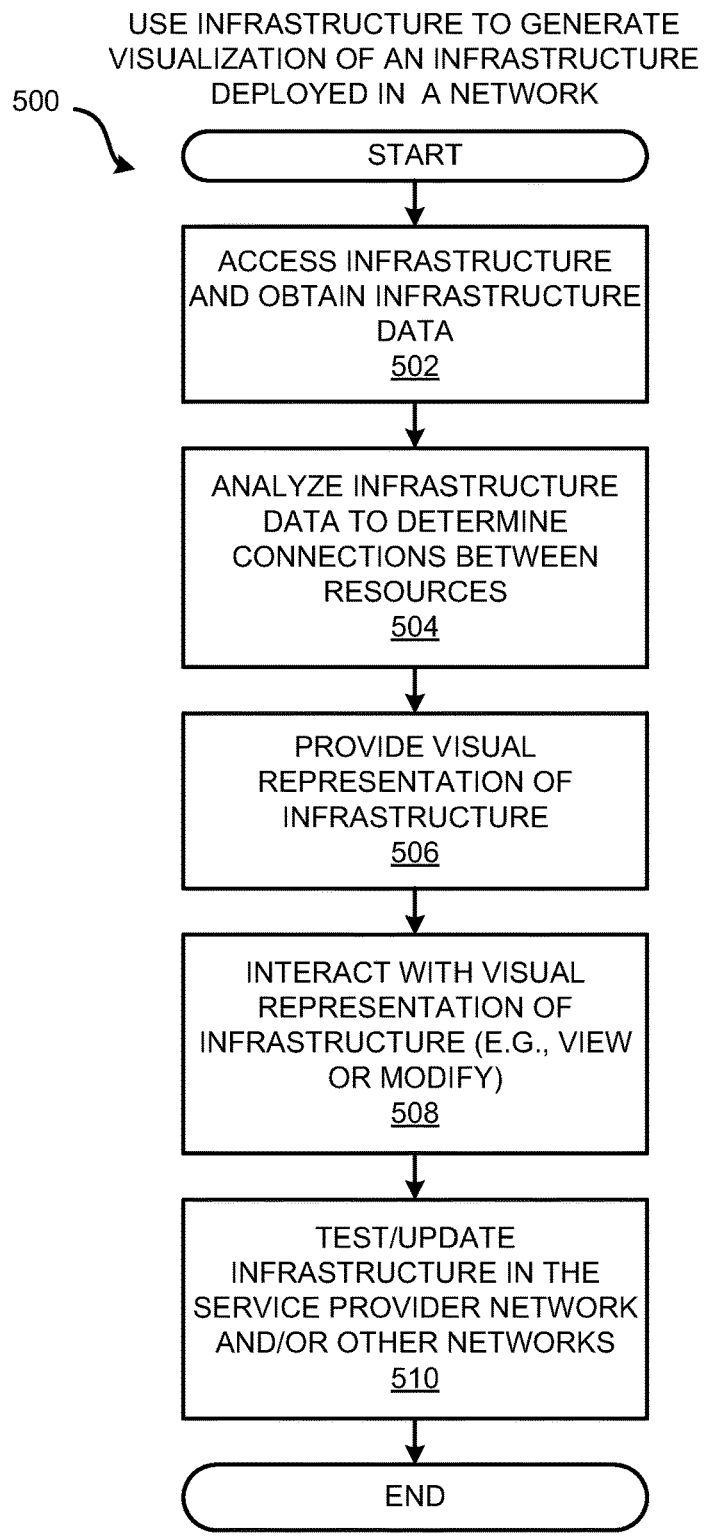
FIG. 5 is a flow diagram showing a routine illustrating aspects of a mechanism disclosed herein for visualizing and interacting with resources of an infrastructure that may be provisioned in a service provider network.
Figure 6:
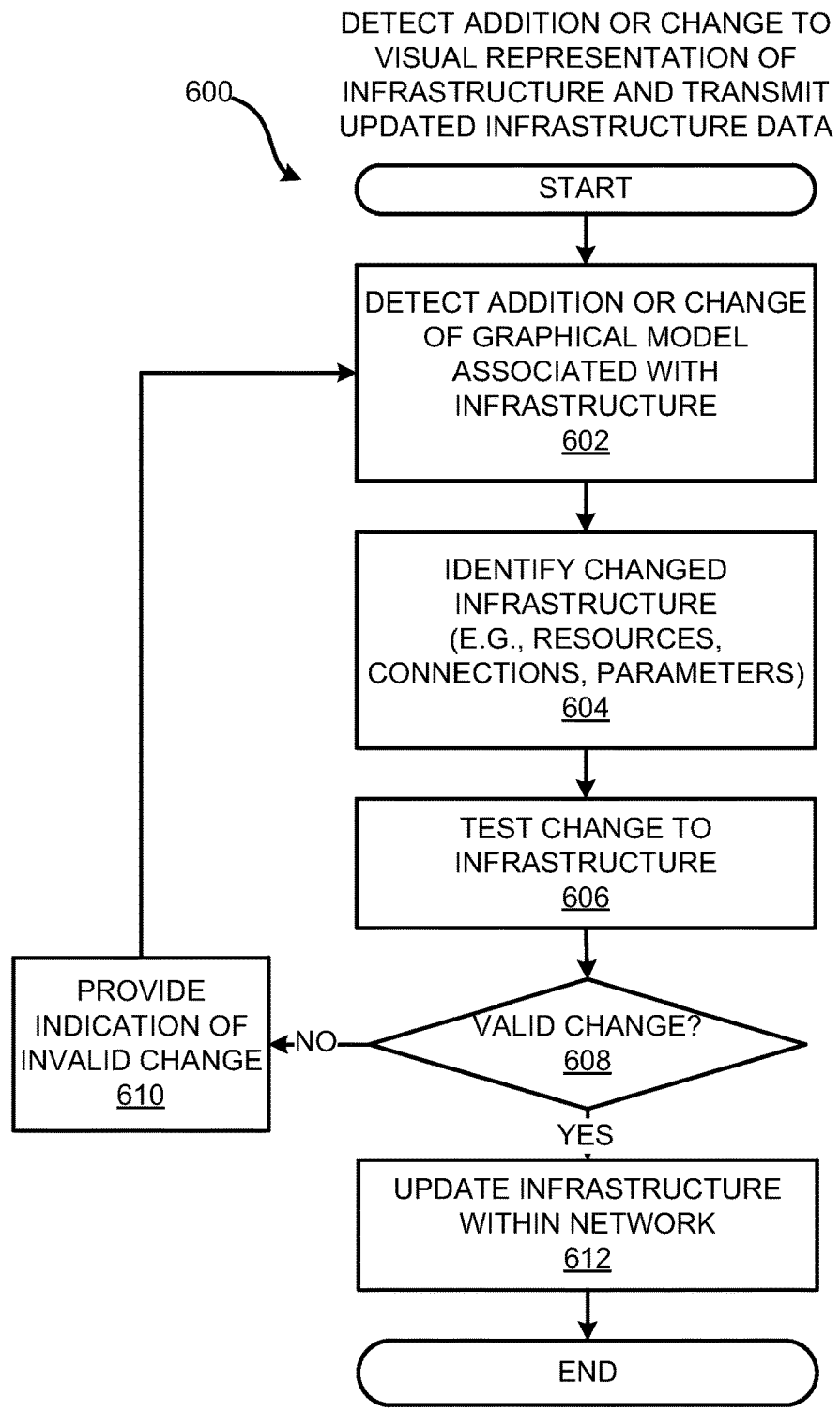
FIG. 6 is a flow diagram showing a routine illustrating aspects of a mechanism disclosed herein for detecting additions or changes to a visual representation of an infrastructure and transmitting updated infrastructure data.

FIGS. 5-6 are flow diagrams showing routines that illustrate aspects of providing a visual representation of an infrastructure. It should be appreciated that the logical operations described herein with respect to FIGS. 5-6, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic and any combination thereof. It should also be appreciated that more or fewer operations may be performed than shown in the FIGS. and described herein. These operations may also be performed in parallel, or in a different order than those described herein.

FIG. 5 is a flow diagram showing a routine 500 illustrating aspects of a mechanism disclosed herein for visualizing and interacting with resources of an infrastructure that may be provisioned in a service provider network 120. The routine 500 may begin at operation 502, where the infrastructure is accessed and infrastructure data 152 is obtained. As discussed above, the infrastructure may already be provisioned and deployed within a service provider network 120, or some other network, or the infrastructure may be defined to be deployed within one or more networks. As also discussed above, the infrastructure data 152 identifies the resources 130 of the infrastructure and may be used by the infrastructure manager 122 to determine connections between the resources 130.

In some examples, the infrastructure provisioned in the service provider network 120 is programmatically examined to identify and obtain resource data about the provisioned resources 130. For example, the infrastructure manager 122 may query each resource that is operating within the service provider network 120 on behalf of the user for one or more applications. In some configurations, data about the resources 130 in the infrastructure are determined from API calls. According to some configurations, a deployed infrastructure may be queried to obtain details about the deployment of the resources in the service provider network 120.

At 504, the infrastructure data 152 is analyzed to determine the layout of the resources. In some examples, these details may be used by a rules engine, or some other components, to determine connections between the resources. For example, different instances connected to a same data storage resource may be graphically illustrated within a same area of the rendering. As discussed above, the infrastructure data 152 may be analyzed by the infrastructure manager 122 that is associated with the configuration service 144. The infrastructure manager 122 may analyze the infrastructure data 152 to create configuration data 114, and possibly a deployment template 125, that may represent the infrastructure that is launched in the service provider network 120 and/or within another network.

At 506, a visual representation of the infrastructure is provided for display. As discussed above, display data 155 might be provided by the infrastructure manager 122 to the VR component 206 or the ER component 302 for display to the user 202. As shown in FIGS. 1-3, the visual representation 150 of an infrastructure may include a display of graphical models within an immersive environment, such as a VR environment or an ER environment. In other examples, the visual representation 150 of an infrastructure may be a two-dimensional or three-dimensional representation.

At 508, the customer, or some other authorized user, may interact with the visual representation 150 of the infrastructure. As discussed above, the customer might interact with the visual representation 150 within a VR environment 200, an ER environment 300, or some other environment, to make changes to the definition of the infrastructure. For example, the user 202 might interact with one or more of the graphical models presented in the visual representation to adjust one or more parameters for one or more of the resources 130 that are displayed. The user 202 might also add or remove resources 130 from the determined infrastructure by interacting with the graphical models.

At 510, the infrastructure may be tested/updated in the service provider network 120 and/or within other networks. As discussed above, the infrastructure might be tested and/or updated in the service provider network 120 and/or other networks using the infrastructure manager 122, the test component 128, the deployment component 126, or some other component or computing device. The routine 500 then proceeds to an end operation.

FIG. 6 is a flow diagram showing a routine 600 illustrating aspects of a mechanism disclosed herein for detecting additions or changes to a visual representation 150 of an infrastructure and transmitting updated infrastructure data 152. The routine 600 may begin at operation 602, where an addition or change of a graphical model within the visual representation 150 of the infrastructure is detected. For example, a graphical model might be removed, a graphical model might be added to the visual representation 150, or a graphical model might be modified in some manner (e.g., change a setting). As discussed above, the change to the visual representation 150 might be detected by the VR component 206, the ER component 306, and/or by some other computing device.

At 604, the changed infrastructure is identified. As discussed above, the infrastructure manager 122 may identify the resources 130, the connections of the resources 130 and values for one or more parameters of the resources that have changed due to the interaction by the user 202 with the visual representation 150.

At 606, the change to the infrastructure is tested. As discussed above, the infrastructure manager 122 or the test component 128 may test changes to the infrastructure before the changes are deployed within the network. For example, the infrastructure manager 122 may simulate the change within the network to determine a validity of the change. In other examples, the infrastructure manager 122 may create a test environment to test the change.

At decision block 608, a determination is made as to whether the change to infrastructure is valid. When the change is not valid, the flow may move to 610 where the visual representation 150 may provide some indication (graphical, sound, haptic) that the change is invalid. In some examples, when the changes are valid, the visual representation 150 may provide some indication (graphical, sound, haptic) that the change is valid. When the change is valid, the flow may move to 612.

At 612, the infrastructure data 152 is updated. As discussed above, the infrastructure manager 122, or some other component (e.g., of the configuration service 144) may deploy the changes to the network based upon the change to the visual representation 150. From operation 612, the routine 600 proceeds to an end operation.

Figure 7:
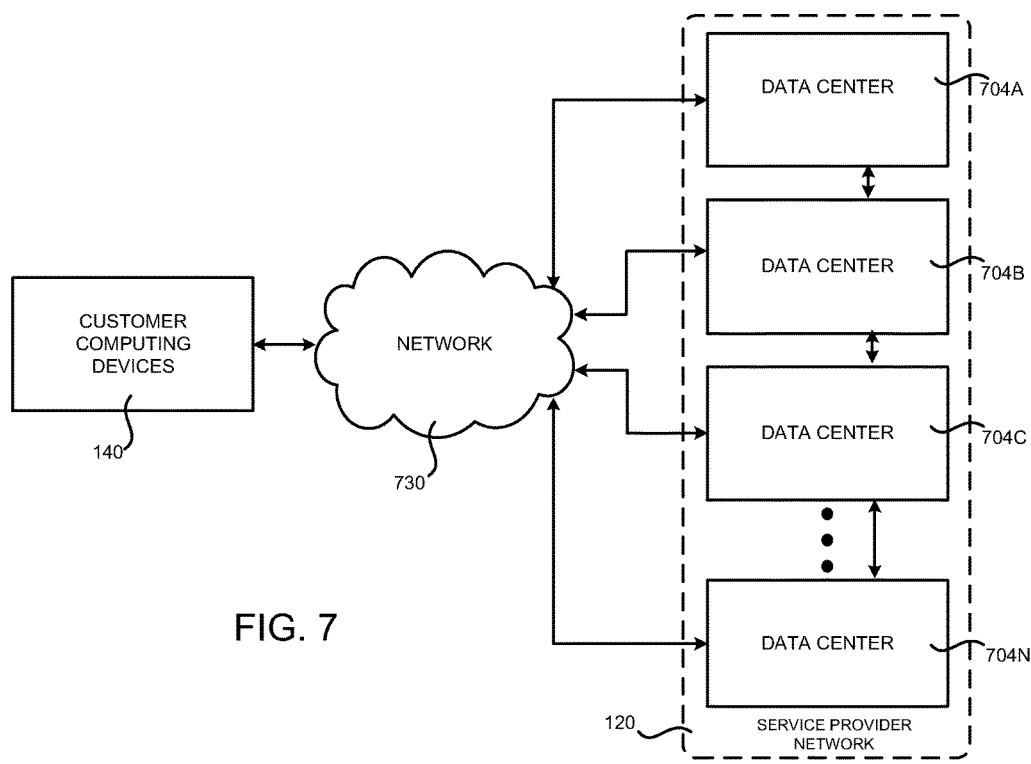
FIG. 7 is a system and network diagram that shows one illustrative operating environment for the technologies disclosed herein that includes a service provider network.

FIG. 7 and the following description are intended to provide a brief, general description of a suitable computing environment in which the technologies described herein may be implemented. In particular, FIG. 7 is a system and network diagram that shows an illustrative operating environment that includes a service provider network 120. As discussed above, the service provider network 120 can provide virtual machine instances 172, other execution environments, and computing resources 130 on a permanent or an as-needed basis.

The computing resources 130 provided by the service provider network 120 may include various types of resources, such as data processing resources, data storage resources, networking resources, data communication resources and the like. Each type of computing resource 130 may be general-purpose or may be available in a number of specific configurations. For example, and as will be described in greater detail below, data processing resources 130 may be available as containers or virtual machine instances 172 in a number of different configurations. The virtual machine instances 172 may be configured to execute applications, including Web servers, application servers, media servers, database servers and other types of applications. Data storage resources 130 may include file storage devices, block storage devices and the like. Each type or configuration of a virtual machine instance of a computing resource 130 may be available in different sizes, such as large resources, consisting of many processors, large amounts of memory, and/or large storage capacity, and small resources consisting of fewer processors, smaller amounts of memory and/or smaller storage capacity.

The computing resources 130 provided by the service provider network 120 are enabled in one implementation by one or more data centers 704A-704N (which may be referred to herein singularly as "a data center 704" or collectively as "the data centers 704"). The data centers 704 are facilities utilized to house and operate computer systems and associated components. The data centers 704 typically include redundant and backup power, communications, cooling and security systems. The data centers 704 might also be located in geographically disparate locations. One illustrative configuration for a data center 704 that implements some or all of the concepts and technologies disclosed herein will be described below with regard to FIG. 8.

The users and customers of the service provider network 120 may access the computing resources provided by the data centers 704 over a suitable data communications network, such as a Wide Area Network ("WAN"), as illustrated by network 730. Although a WAN might be used, it should be appreciated that a local-area network ("LAN"), the Internet, or any other networking topology known in the art that connects the data centers 704 to the customer computing devices 140 may be utilized. It should also be appreciated that combinations of such networks might also be utilized.

Figure 8:
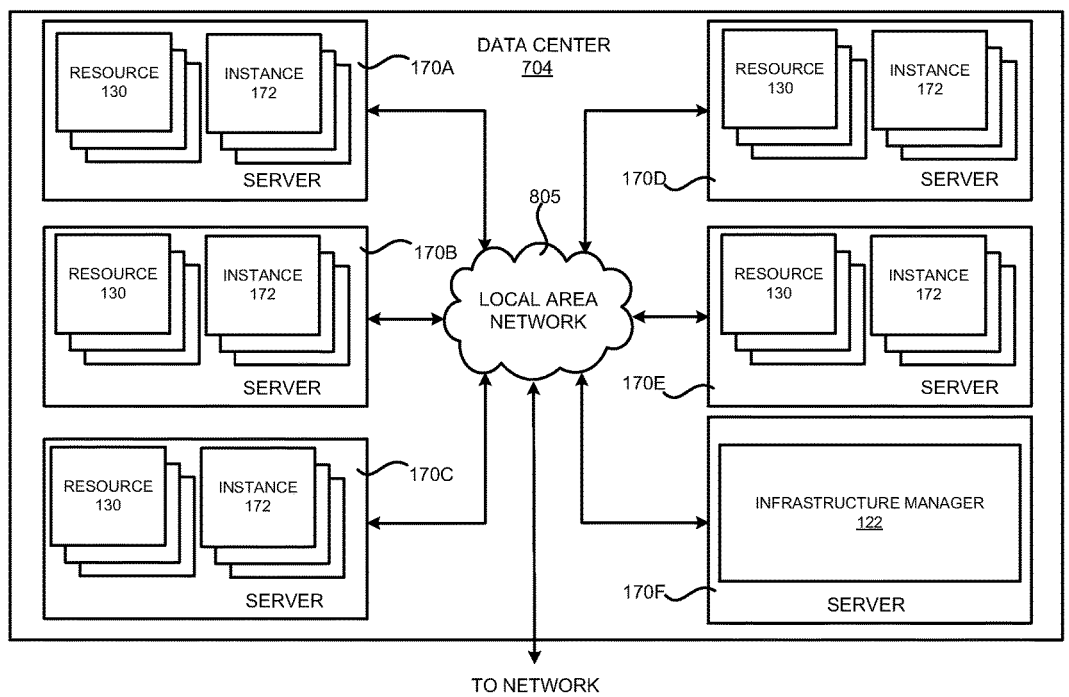
FIG. 8 is a computing system diagram that illustrates one configuration for a data center that implements aspects of a service provider network, including some or all of the concepts and technologies disclosed herein for providing and interacting with a visual representation of an infrastructure.

FIG. 8 is a computing system diagram that illustrates one configuration for a data center 704 that implements aspects of a service provider network 120, including some or all of the concepts and technologies disclosed herein for providing and interacting with a visual representation 150 of an infrastructure. The example data center 704 shown in FIG. 8 includes several computers, such as servers 170A-170F (which may be referred to herein singularly as "a server computer 170" or in the plural as "the server computers 170") for providing computing resources 130. The server computers 170 may be standard tower or rack-mount server computers configured appropriately for providing the computing resources described herein. In one configuration the server computers 170 are configured to execute the software products as described above.

In one configuration, some of the computing resources are the virtual machine instances 172 and the resources 130. As known in the art, a virtual machine instance is an instance of a software implementation of a machine (i.e. a computer) that executes programs like a physical machine. Each of the server computers 170 may be configured to execute an instance manager (not shown) capable of instantiating and managing resources 130 and VM instances 172. In the case of virtual machine instances, for example, the instance manager might be a hypervisor or another type of program configured to enable the execution of multiple virtual machine instances 172 on a single server computer 170, for example.

It should be appreciated that although the technologies disclosed herein are described primarily in the context of virtual machine instances, other types of computing resources can be utilized with the concepts and technologies disclosed herein. For instance, the technologies disclosed herein might be utilized with hardware resources, data storage resources, data communications resources, networking resources, database resources and with other types of computing resources.

The data center 704 shown in FIG. 8 also includes a server computer 170F reserved for executing software components for managing the operation of the data center 704, the server computers 170, virtual machine instances 172, and other resources 130 within the service provider network 120. The server computer 170F might also execute the infrastructure manager 122. Details regarding the operation of this component have been provided above. In this regard, it should be appreciated that while these components are illustrated as executing within the service provider network 120, computing systems that are external to the service provider network 120 might also be utilized to execute some or all of these components. Other configurations might also be utilized.

In the example data center 704 shown in FIG. 8, an appropriate local area network ("LAN") 805 is utilized to interconnect the server computers 170A-170E and the server computer 170F. The LAN 805 is also connected to the network illustrated in FIG. 8. It should be appreciated that the configuration and network topology illustrated in FIGS. 7 and 8 has been greatly simplified and that many more computing systems, networks and networking devices may be utilized to interconnect the various computing systems disclosed herein. Appropriate load balancing devices or software modules might also be utilized for balancing a load between each of the data centers 704A-704N, between each of the server computers 170A-170F in each data center 704 and between virtual machine instances 172 and other types of computing resources 130 provided by the service provider network 120.

It should be appreciated that the data center 704 described in FIG. 8 is merely illustrative and that other implementations might also be utilized. Additionally, it should be appreciated that the functionality provided by these components might be implemented in software, hardware, or a combination of software and hardware. Other implementations should be apparent to those skilled in the art.

Figure 9:
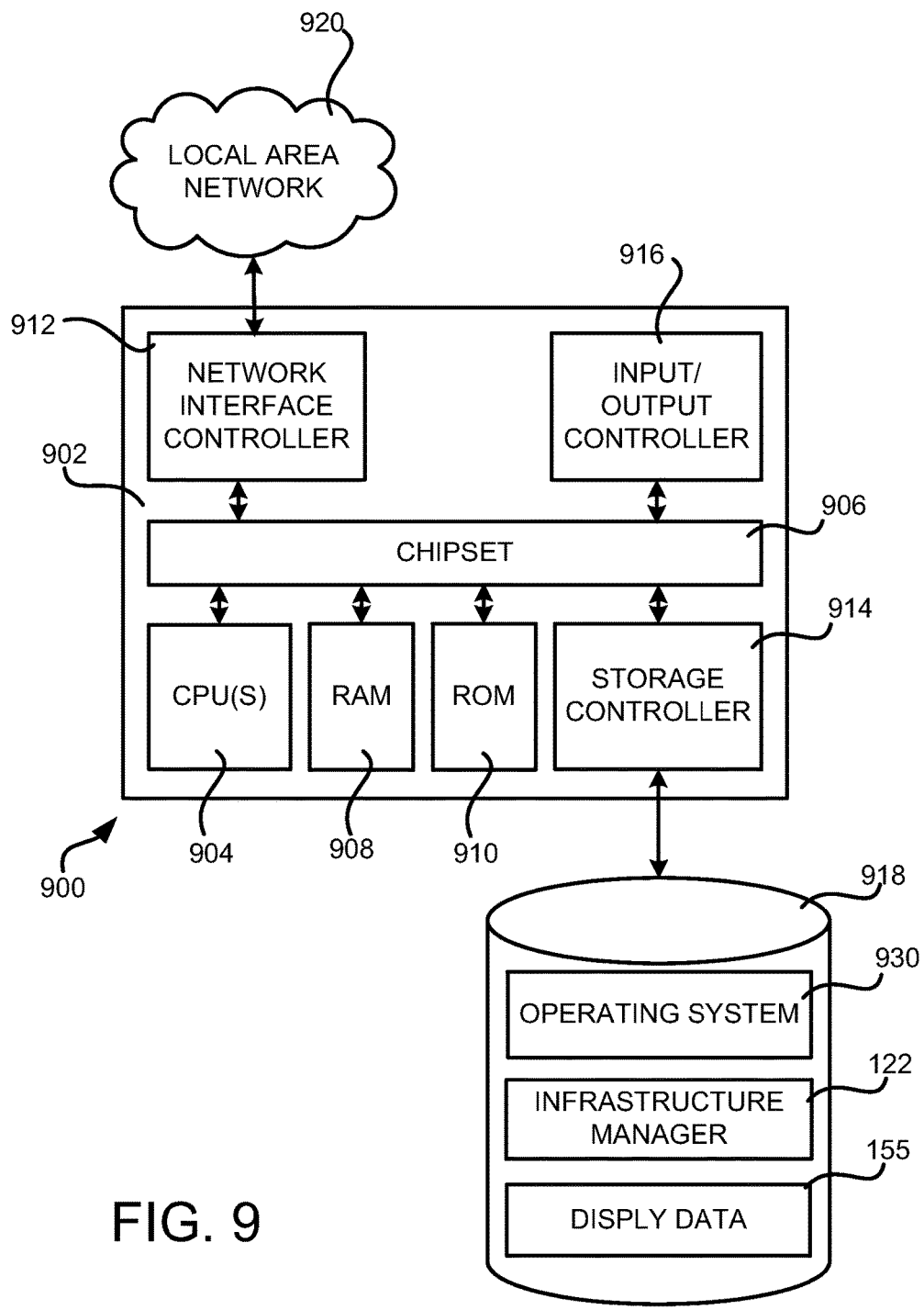
FIG. 9 is a computer architecture diagram showing one illustrative computer hardware architecture for implementing a computing device that might be utilized to implement aspects of the various technologies presented herein.

FIG. 9 shows an example computer architecture for a computer 900 capable of executing program components for interacting with a visual representation 150 for an infrastructure in the manner described above. The computer architecture shown in FIG. 9 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 9 may be utilized to execute software components for performing operations as described above. The computer architecture shown in FIG. 9 might also be utilized to implement a customer computing device 140, the server computers 170, the configuration service 144, or any other of the computing systems described herein.

The computer 900 includes a baseboard 902, or "motherboard," which is a printed circuit board to which a multitude of components or devices may be connected by way of a system bus or other electrical communication paths. In one illustrative configuration, one or more central processing units ("CPUs") 904 operate in conjunction with a chipset 906. The CPUs 904 may be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 906 provides an interface between the CPUs 904 and the remainder of the components and devices on the baseboard 902. The chipset 906 may provide an interface to a RAM 908, used as the main memory in the computer 900. The chipset 906 may further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM may also store other software components necessary for the operation of the computer 900.

The computer 900 may operate in a networked environment using logical connections to remote computing devices and computer systems through a network, such as the local area network 920. The chipset 906 may include functionality for providing network connectivity through a network interface controller ("NIC") 912, such as a gigabit Ethernet adapter. The NIC 912 is capable of connecting the computer 900 to other computing devices over the local area network 920. It should be appreciated that multiple NICs 912 may be present in the computer 900, connecting the computer to other types of networks and remote computer systems.

The computer 900 may be connected to a mass storage device 918 that provides non-volatile storage for the computer. The mass storage device 918 may store system programs, application programs, other program modules and data, which have been described in greater detail herein. The mass storage device 918 may be connected to the computer 900 through a storage controller 914 connected to the chipset 906. The mass storage device 918 may consist of one or more physical storage units. The storage controller 914 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 may store data on the mass storage device 918 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 918 is characterized as primary or secondary storage and the like.

For example, the computer 900 may store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the mass storage device 918 by detecting the physical states or characteristics of one or more particular locations within the physical storage units.

In addition to the mass storage device 918 described above, the computer 900 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 900.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 918 may store an operating system 930 utilized to control the operation of the computer 900. In one configuration, the operating system comprises the LINUX operating system. In another configuration, the operating system comprises the WINDOWS® SERVER operating system from MICROSOFT Corporation. In other configurations, the operating system may comprise the UNIX operating system. It should be appreciated that other operating systems may also be utilized. The mass storage device 918 may store other system or application programs and data utilized by the computer 900, such as components that include the infrastructure manager 122, the configuration data 114 and/or any of the other software components and data described above. The mass storage device 918 might also store other programs and data not specifically identified herein.

In one configuration, the mass storage device 918 or other computer-readable storage media is encoded with computer-executable instructions which, when loaded into the computer 900, transform the computer from a general-purpose computing system into a special-purpose computer capable of implementing the technologies described herein. These computer-executable instructions transform the computer 900 by specifying how the CPUs 904 transition between states, as described above. In one configuration, the computer 900 has access to computer-readable storage media storing computer-executable instructions which, when executed by the computer 900, perform the various routines described above with regard to FIGS. 5-6. The computer 900 might also include computer-readable storage media for performing any of the other computer-implemented operations described herein.

The computer 900 may also include one or more input/output controllers 916 for receiving and processing input from a number of input devices, such as a keyboard, a mouse, a touchpad, a touch screen, an electronic stylus, or other type of input device. Similarly, the input/output controller 916 may provide output to a display, such as a heads-up display, a helmet mounted display, a computer monitor, a flat-panel display, a digital projector, a printer, a plotter, or other type of output device. It will be appreciated that the computer 900 may not include all of the components shown in FIG. 9, may include other components that are not explicitly shown in FIG. 9, or may utilize an architecture completely different than that shown in FIG. 9.

Based on the foregoing, it should be appreciated that technologies for visualizing and interacting with resources of an infrastructure displayed within a visual representation 150 in a network, such as a service provider network and/or other networks have been presented herein. Moreover, although the subject matter presented herein has been described in language specific to computer structural features, methodological acts and computer readable media, it is to be understood that the invention defined in the appended claims is not necessarily limited to the specific features, acts, or media described herein. Rather, the specific features, acts and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. A computer-implemented method, comprising:
   obtaining, from one or more computers of a service provider network, infrastructure data for an infrastructure of an application that operates in the service provider network on behalf of a customer of the service provider network, the infrastructure data identifying resources for the infrastructure, including virtual computing resources, provisioned within the service provider network on behalf of the customer;
   determining, based at least in part on the infrastructure data, connection data identifying connections between at least a portion of the resources provisioned within the service provider network;
   generating, based at least in part on the infrastructure data and the connection data, a deployment template;
   generating, based at least in part on the infrastructure data, the connection data, and the deployment template, display data used to provide a three-dimensional visual representation of the resources provisioned within the service provider network;
   providing the display data to a customer computing device that is external to the service provider network;
   receiving interaction data from the customer computing device, the interaction data indicating a change to the three-dimensional visual representation of the resources within the service provider network;
   identifying a change to the infrastructure based, at least in part, on the interaction data;
   testing a validity of the change to the infrastructure;
   updating the display data based, at least in part, on the validity of the change to the infrastructure within the service provider network; and
   provisioning the change to infrastructure within the service provider network based, at least in part, on the validity of the change to the infrastructure.

2. The computer-implemented method of claim 1, wherein generating the display data comprises creating the display data for at least one of a virtual reality environment or an enhanced reality environment.

3. The computer-implemented method of claim 1, wherein identifying the change to the infrastructure comprises identifying at least one of a deletion of one or more resources, an addition of one or more resources, or a change to a parameter of one or more resources.

4. The computer-implemented method of claim 3, further comprising updating the display data to indicate an operating state of the resources provisioned in the service provider network.

5. The computer-implemented method of claim 1, wherein the three-dimensional visual representation comprises a display of three-dimensional graphical models, the three-dimensional graphical models representing the resources of the infrastructure, and wherein the three-dimensional graphical models represent the virtual computing resources, and at least one of a database resource, a storage resource, a security resource, an auto-scale resource, or a networking resource.

6. A system, comprising:
   one or more computers operative to:
   analyze infrastructure data associated with an infrastructure for an application executing in a service provider network, the infrastructure data identifying resources provisioned in the service provider network and data about the resources, the resources including software computing resources provisioned on behalf of the customer in the service provider network;

use at least a portion of the infrastructure data to generate configuration data describing a configuration of the resources within the service provider network associated with the infrastructure and to determine connection data identifying connections between at least a portion of the resources;

generate a deployment template based, at least in part, on the configuration data and the connection data;

provide, to a computing device that is external to the service provider network, display data to present a visual representation of the infrastructure, wherein the display data is based, at least in part, on the deployment template;

identify an infrastructure change to the infrastructure in response to a change made to at least one or more resources displayed within the visual representation;

determine the infrastructure change is valid;

update the display data, based, at least in part, on determining the infrastructure change is valid; and cause the infrastructure change to be provisioned within the service provider network based, at least in part, on determining the infrastructure change is valid.

7. The system of claim 6, wherein to identify the infrastructure change includes to identify at least one of a deletion of one or more resources, an addition of one or more resources, or a change to a parameter of one or more resources.

8. The system of claim 7, wherein determine the connection data identifying the connections between the at least a portion of the resources comprises identifying two or more resources from the resources that utilize a same resource within the infrastructure and indicating a connection between the two or more resources.

9. The system of claim 6, wherein the visual representation of the infrastructure is presented within a virtual reality environment or an enhanced reality environment.

10. The system of claim 6, wherein the one or more computers are further operative to obtain operating data indicating an operating state of at least one of the resources provisioned in the service provider network and cause the visual representation to be updated based, at least in part, on the operating data.

11. The system of claim 6, wherein the at least one or more resources displayed within the visual representation includes at least one of a graphical shape, a graphical indicator, graphical model, alphanumeric text, or an icon.

12. The system of claim 11, wherein to update the display data further comprises an operating state of one or more of the resources provisioned in the service provider network.

13. The system of claim 11, the one or more computers further operative to: update the deployment template, based, at least in part, on the infrastructure change.

14. A non-transitory computer-readable storage medium having computer-executable instructions stored thereupon which, when executed by one or more processors of a computer, cause the computer to:

access infrastructure data identifying resources provisioned in a service provider network on behalf of a customer of the service provider network;

cause configuration data to be generated based at least in part on the infrastructure data, the configuration data describing a configuration of the resources within the service provider network, wherein the configuration data includes connection data identifying connections between at least a portion of the resources;

generate a deployment template, based, at least in part, on the configuration data and the connection data;

generate display data based, at least in part, on the deployment template; and provide, to a computing device that is external to the service provider network, the display data used to present a three-dimensional visual representation of the infrastructure;

identify a change made to the infrastructure via the three-dimensional visual presentation;

test a validity of the change to the infrastructure;

update the display data, based at least in part, on the validity of the change to the infrastructure; and cause the infrastructure for the application executing in the service provider network to be updated to reflect the change to the infrastructure based, at least in part, on the validity of the change to the infrastructure.

15. The non-transitory computer-readable storage medium of claim 14, wherein generate the display data comprises to identify types of resources provisioned in the service provider network and to generate display data for graphical models based, at least in part, on the types of resources.

16. The non-transitory computer-readable storage medium of claim 14, wherein to identify the infrastructure change includes to identify at least one of a deletion of one or more resources, an addition of one or more resources, or a change to a parameter of one or more resource.

17. The non-transitory computer-readable storage medium of claim 14, wherein the computer-executable instructions further cause the computer to provide, to the computing device, an indication of an operating state of at least one resource provisioned in the service provider network.

18. The computer-implemented method of claim 1, wherein testing a validity of the change to the infrastructure further comprises:

identifying a resource parameter with a first supported value before the change to the infrastructure; and identifying the resource parameter with a second supported value after the change to the infrastructure, wherein the second supported value is at least one of the first supported value or a new supported value.

19. The non-transitory computer-readable storage medium of claim 14, wherein the change made to the infrastructure comprises at least interaction data from the computer device.

20. The non-transitory computer-readable storage medium of claim 15, wherein the types of resources comprise at least one of a storage resource, a data base resource, a security resource, and a networking resource.

* * * * *